United States Patent
Aljundi

[11] Patent Number: 5,163,736
[45] Date of Patent: Nov. 17, 1992

[54] INERTIAL LOCK MECHANISM FOR VEHICLE SEAT RECLINING APPARATUS

[75] Inventor: Safwan Aljundi, Ann Arbor, Mich.

[73] Assignee: Ford Motor Company, Dearborn, Mich.

[21] Appl. No.: 703,535

[22] Filed: May 21, 1991

[51] Int. Cl.$^5$ ............................................. B60N 2/02
[52] U.S. Cl. .................................... 297/379; 297/374
[58] Field of Search ............... 297/379, 216, 355, 374, 297/378

[56] References Cited

U.S. PATENT DOCUMENTS

| | | |
|---|---|---|
| 3,285,657 | 11/1966 | De Gaston . |
| 3,405,971 | 10/1968 | Kobrehel . |
| 3,602,547 | 8/1971 | Tabor . |
| 4,045,079 | 8/1977 | Arlauskas et al. . |
| 4,103,967 | 8/1978 | Tanaka et al. . |
| 4,118,067 | 10/1978 | Tanaka . |
| 4,225,177 | 9/1986 | Kluting . |
| 4,252,370 | 2/1981 | Kluting et al. . |
| 4,314,729 | 2/1982 | Kleuting ............. 297/379 X |
| 4,318,569 | 3/1982 | Bilenchi et al. . |
| 4,358,155 | 11/1982 | Osterhold et al. . |
| 4,366,984 | 1/1983 | Klueting et al. ............. 297/379 |
| 4,402,547 | 9/1983 | Weston et al. . |
| 4,408,799 | 10/1983 | Bowman ............. 297/374 X |
| 4,579,387 | 4/1986 | Bell . |
| 4,687,252 | 8/1987 | Bell et al. ............. 297/374 |
| 4,702,353 | 10/1987 | Yang ............. 297/216 X |
| 4,707,010 | 11/1987 | Croft et al. . |
| 4,720,145 | 1/1988 | Bell . |
| 4,733,912 | 3/1988 | Secord ............. 297/379 |
| 4,743,067 | 5/1988 | Pipon et al. . |

Primary Examiner—Kenneth J. Dorner
Assistant Examiner—James M. Gardner
Attorney, Agent, or Firm—Roger L. May; Daniel M. Stock

[57] ABSTRACT

An emergency inertia lock 24 is provided on a tilt lock 20 of a vehicle seat 12 hinge 18. The tilt lock 20 allows adjustment of the degree of tilt between the seat back 16 and seat bottom 14 by disengaging then re-engaging. A spring drum clutch 36 locks a clutch spur gear 32 in a series of spur gears (28, 30). A first extension 38 of the spring drum clutch 36 may be shifted to release the tilt lock 20 manually. A torsion pendulum 52 includes forward and rearward extensions 58 and 60 which contact a second extension 40 of the spring drum clutch 36 to re-engage the tilt lock 20 if it is manually released when a sufficient interial load is applied. A reset lever 70 is provided to reset the tilt lock 20.

18 Claims, 2 Drawing Sheets

INERTIAL LOCK MECHANISM FOR VEHICLE SEAT RECLINING APPARATUS

TECHNICAL FIELD

The present invention relates to an emergency lock mechanism for a vehicle seat reclining apparatus. It more particularly relates an inertial lock for a seat back tilt adjustment apparatus.

BACKGROUND OF THE INVENTION

Vehicle seat tilt adjustment is an important feature to automotive vehicle purchasers. A vehicle seat can be made more comfortable for drivers and passengers by providing a convenient "user friendly" tilt adjustment. On long drives, it is helpful to occasionally adjust the degree of seat back inclination for driver comfort. Passengers may also wish to adjust the seat back periodically to a more comfortable position.

Vehicle seat tilt adjustment devices can generally be categorized into two groups, constantly engaged adjustment mechanisms and disengagable adjustment mechanisms. Constantly engaged mechanisms such as those disclosed in U.S. Pat. No. 4,358,155 and 4,402,547 are usually more difficult to use. A knob is turned manually to adjust the seat back position.

Many drivers prefer a disengagable tilt adjustment wherein a lever is pushed to release the seat back tilt lock while the user moves his back to the new position. An example of a disengagable adjustment mechanism is disclosed in U.S. Pat. No. 3,602,547. During tilt adjustment, the seat back is disengaged and is free to move forward or backward within a limited range. With disengagable tilt adjustment mechanisms, the seat is typically urged to its full up-right position by a spring biasing means. Such devices are generally considered safe and effective tilt adjustment mechanisms.

These and other problems are addressed by the invention as summarized below.

DISCLOSURE OF INVENTION

The present invention relates to the recliner mechanism for a vehicle seat. A hinge connects the bottom and back of the vehicle seat with means for tilting the seat back relative to the seat bottom. A tilt lock selectively locks the hinge in a desired position. A release operates the tilt lock selectively disengaging the tilt lock in a first mode to permit re-positioning of the seat back and re-engaging the tilt lock in a second mode. An inertia lock operates on the tilt lock to lock the hinge when an inertial load above a pre-determined threshold level is applied to the inertia lock when the tilt lock is in its first mode.

According to other aspects of the invention, the inertia lock comprises a pivotally mounted member which is partially rotated when the inertial load is applied to the inertia lock. More specifically, means are provided to engage the tilt lock upon application of either forward or backward inertial loads. The member engaging the inertial lock preferably has a vertical weight imbalance such that a rotational force is applied about the axis of the pivot to allow either a forward extending lug or a rearward extending lug to engage the tilt lock when pivoted.

The tilt lock is preferably a spring drum clutch which is disposed on a stub shaft. The stub shaft rotates within the spring drum clutch when the seat back is tilted and the spring drum clutch frictionally grips the stub shaft to lock the hinge otherwise. More particularly, the spring drum clutch preferably has first and second extensions from a helical portion that encircles the stub shaft. The first extension is connected to the release means and the second extension is connected to the inertial lock means. The release means disengages the grip of the spring drum clutch on the stub shaft while the inertia lock means increases the frictional grip of the spring drum clutch on the stub shaft upon application of an inertial load.

The stub shaft engaged by the spring drum clutch is preferably part of a spur gear which operatively engages a series of reduction spur gears. The reduction spur gears preferably interconnect the spur gear of the stub shaft through the series of reduction spur gears to a sector plate portion disposed on the hinge.

According to another aspect of the invention, the inertia lock means is a torsion pendulum which engages the tilt lock means under all circumstances when an inertial load above a predetermined threshold is applied to the torsion pendulum.

Other features and objects of the invention will become apparent when viewing the attached drawings and following detailed description of the preferred embodiment of the invention.

BEST MODE FOR CARRYING OUT INVENTION

Figure 1:
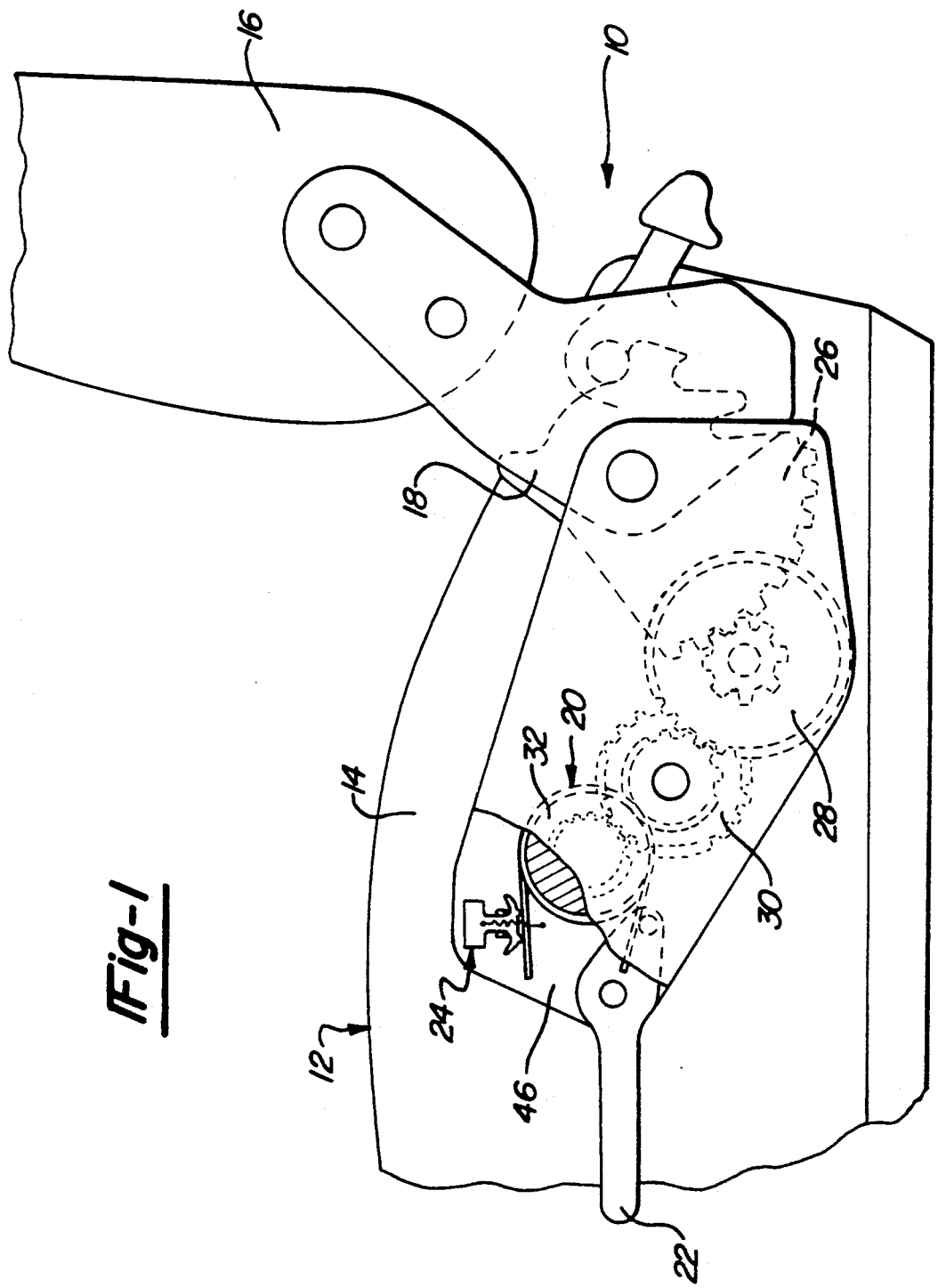
FIG. 1 is a side elevation view of the recliner mechanism present invention.

Referring now to FIG. 1, the recliner mechanism 10 of the present invention is shown as part of a vehicle seat 12. Vehicle seat 12 includes a seat bottom 14 and a seat back 16 which are interconnected by a seat hinge 18. A tilt lock 20 is provided on the seat hinge 18 to permit adjustment of the angular orientation of the seat back 16 relative to the seat bottom 14. A release lever 22 is provided to release the tilt lock 20 and hold it in a re-positioning mode when a vehicle occupant wishes to change the degree of tilt of the seat back 16 relative to the seat bottom 14. An emergency inertia lock 24 is included as part of the tilt lock 20 for locking the tilt lock 20 even if the release lever 22 is in its re-positioning mode.

Seat hinge 18 preferably includes a sector plate 26 which is engaged by a first spur gear 28 which rotates along the sector plate 26 to change the vehicle seat 12 tilt. A second spur gear 30 engages the first spur gear 28 and a clutch spur gear 32. Collectively, the first and second spur gears and the clutch spur gear operate as a gear reduction set to provide a simple and effective tilt lock.

Figure 2:
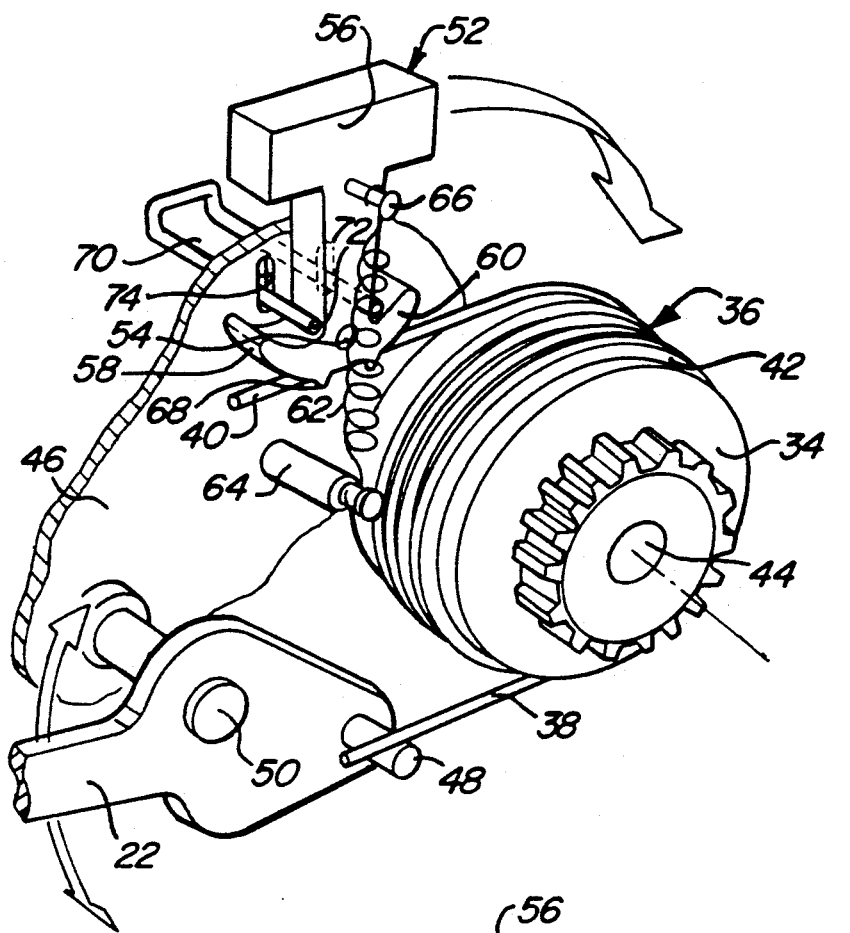
FIG. 2 is a perspective view showing the portion of the tilt lock including the release mechanism and mechanism according to the present invention.
Figure 3:
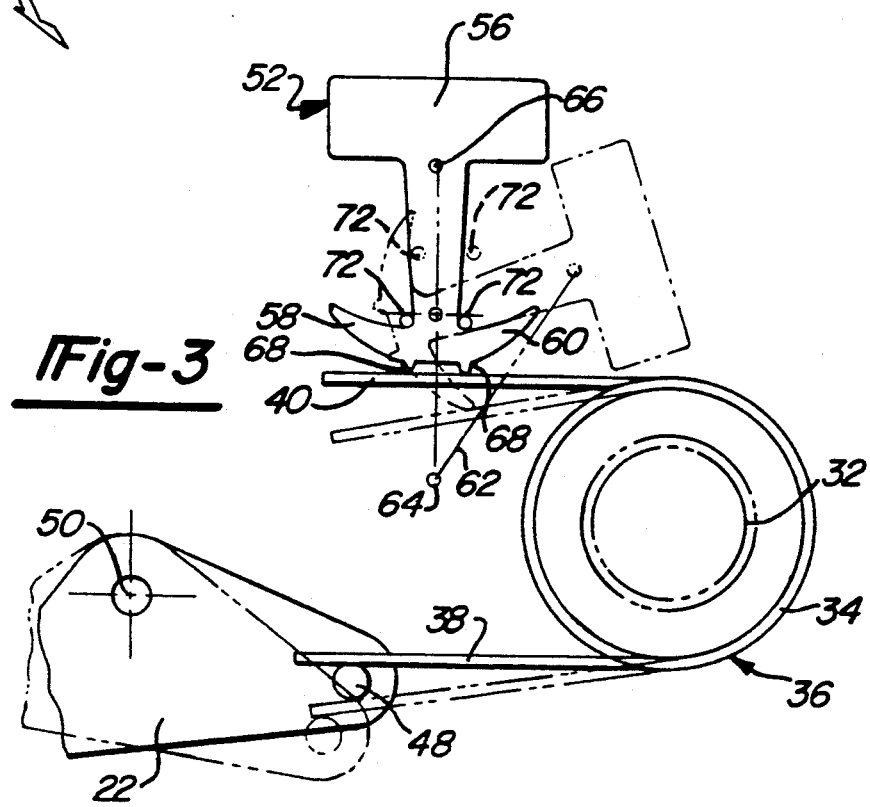
FIG. 3 is a side elevation schematic view showing the inertia lock operating to lock the tilt lock even though the manual release is engaging the tilt lock to allow the repositioning of the vehicle seat.

Referring now to FIGS. 2 and 3, the clutch spur gear 32 is shown in greater detail. Clutch spur gear 32 includes a drum 34 which is encircled by a helical spring 36. Spring 36 includes a first extension 38 at one end and a second extension 40 at the other end of the series of coils 42 of the helical portion forming the spring 36. The clutch spur gear 32 is mounted for rotation on a shaft 44 which is secured to a mounting plate 46. Mounting plate 46 is secured to the seat bottom 14.

Manual release lever 22 includes a pin 48 which is engaged by the first extension 38 of the spring 36. Release lever 22 pivots on pivot pin 50 to cause the pin 48 to move upwardly and downwardly. To move the pin 48 upwardly causes an increase in pressure exerted on the drum while moving the pin downwardly results in a decrease in the pressure exerted by the spring 36 on the drum 34.

Inertia lock 24 preferably includes a torsion pendulum 52 which rotates about a pivot pin 54 in response to application of inertial forces thereto. The torsion pendulum 52 includes a head portion 56 which is relatively massive compared with the other parts of the torsion pendulum 52. Upon application of inertial forces, the head 56 is caused to rotate about the pivot pin 54 due to its vertical weight imbalance. A forward extension 58 and a rearward extension 60 are formed on the opposite end of the torsion pendulum 52 from the head 56. Forward and rearward extensions 58 and 60 in the normal position of the pendulum 52 are disposed above the second extension 40. If an inertial force of pre-determined magnitude is applied to the inertial lock 24 the head 56 will be rotated. The head 56 rotates in a clockwise direction upon application of a force from the rear of the vehicle causing the rearward extension 60 to force the second extension 40 downward causing an increase in tension applied by the spring 36 to the drum 34. Conversely, if a force is applied to the system from the forward direction, as upon forward impact, the head 56 would rotate counter-clockwise about the pivot pin 54 and cause the forward extension 58 to depress the second extension 40 and likewise increase the force applied by the spring 36 upon the drum 34.

A spring 62 is connected to an anchor pin 64 on the plate 46 and a pendulum pin 66 which extends from the torsion pendulum 52. The spring 62 is effective to hold the pendulum in its tipped position with the forward extension 58 or rearward extension 60 depressing the second extension 40 of the spring 36.

A pair of stabilizing ribs 68 are preferably provided on the lower portion of the torsion pendulum 52 which retard pivoting movement of the torsion pendulum 52 until an inertial force of pre-determined magnitude is applied to the torsion pendulum 52. The stabilizing ribs 68 prevent inadvertent engagement of the emergency lock. Alternatively, a flat section could be formed on the base of the torsion pendulum for the same purpose.

A reset lever 70 is also provided to reset the torsion pendulum in its vertical orientation after the tilt lock has been activated. The reset lever 70 is connected to a pair of tines 72 which engage opposite sides of the torsion pendulum 52. Tines 72 extend through a pair of slots 74 which extend vertically in the mounting plate 46. When the torsion pendulum 52 tips over locking the tilt lock, one of the tines 72 is shifted upwardly in its associated slot 74. The reset lever 70 may then be lifted causing both tines 72 to engage the torsion pendulum 52 and thereby resetting the torsion pendulum in a balanced condition on the stabilizing ribs 68. The reset lever 70 overcomes the force of the spring 62 which tends to hold the torsion pendulum 52 down.

The foregoing description of preferred embodiments of the present invention are intended to be examples and are not to be read in a limiting sense. The scope of the invention should be construed and interpreted based upon the following claims.

I claim:

1. A recliner mechanism for a vehicle seat having a seat bottom and a seat back comprising:

hinge means interconnecting said seat bottom and said seat back for tilting said seat back relative to said seat bottom;

tilt lock means for selectively locking said hinge means in a desired position, said tilt lock means further comprising a shaft and frictional gripping member engaging said shaft;

release means operatively connected to said tilt lock means for selectively disengaging said tilt lock means in a re-positioning mode to permit repositioning said seat back and for reengaging said tilt lock means in a locked mode; and inertia lock means operatively connected to said tilt lock means for locking said hinge means with said tilt lock means when an inertial load above a pre-determined threshold is applied to said inertia lock means wherein said frictional gripping member is locked onto the shaft to lock the hinge against tilting even when said release means is in said re-positioning mode.

2. The recliner mechanism of claim 1 wherein said inertia lock means comprises a pivotally mounted member partially rotatable about a transverse axis, said member being partially rotated when said inertial load is applied to said inertia lock means, said member having means for engaging said tilt lock means to lock said tilt lock means.

3. The recliner mechanism of claim 2 wherein said means for engaging said tilt lock means is a longitudinal extension from said member.

4. The recliner mechanism of claim 2 wherein said means for engaging said tilt lock means is a forwardly extending lug and a rearwardly extending lug, wherein upon application of said inertial load from a forward direction said forwardly extending lug engages said tilt lock means and upon application of said inertial load from a rearward direction said rearwardly extending lug engages said tilt lock means.

5. The recliner mechanism of claim 2 wherein said member has a weight imbalance vertically above and below said means for engaging said tilt lock means is a forwardly extending lug and a rearwardly extending lug, wherein upon application of said inertial load from a forward direction said forwardly extending lug engages said tilt lock means and upon application of said inertial load from a rearward direction said rearwardly extending lug engages said tilt lock means.

6. The recliner mechanism of claim 2 wherein said member has a weight imbalance vertically above and below said transverse axis whereby application of an inertial load results in a pivoting moment about said transverse axis.

7. The recliner mechanism of claim 1 wherein said tilt lock means is a spring drum clutch disposed on a stub shaft, said stub shaft rotating when said seat back is tilted, said spring drum clutch frictionally gripping said stub shaft to lock said hinge means.

8. The recliner mechanism of claim 7 wherein said spring drum clutch has first and second extensions from a helical wound portion said first extension being connected to said release means, and said second extension being connected to said inertia lock means, whereby said release means disengages the grip of said spring drum clutch on said stub shaft and said inertia lock means increases the frictional grip of said spring drum clutch on said stub shaft.

9. The recliner mechanism of claim 7 wherein said stub shaft is part of a spur gear, said spur gear operatively engaging a series of reduction spur gears.

10. The recliner mechanism of claim 9 wherein said hinge means has a sector plate portion, said sector plate portion being mounted on said seat back in a fixed orientation and being repositionable relative to said seat bottom, said series of reduction spur gears interconnecting said spur gear including said stub shaft to said sector plate.

11. The recliner mechanism of claim 1 wherein said inertia lock means is a torsion pendulum which engages said tilt lock means to lock said tilt lock means when said inertia load is applied to said torsion pendulum.

12. The recliner mechanism of claim 11 wherein said inertia lock includes a spring means connecting the torsion pendulum to said hinge for establishing the threshold level and for holding said torsion pendulum in its locked position after the threshold level is exceeded.

13. The recliner mechanism of claim 12 wherein said inertia lock further includes a reset means for returning said torsion pendulum to a position in which the inertia lock is not locked.

14. A recliner mechanism for a vehicle seat having a seat bottom and a seat back comprising:
hinge means interconnecting said seat bottom and said seat back for tilting said seat back relative to said seat bottom, said hinge means having a sector plate portion, said sector plate portion being mounted on said seat back in a fixed orientation and being repositionable relative to said seat bottom;
tilt lock means for selectively locking said hinge means in a desired position, said tilt lock means comprising a spring drum clutch disposed on a stub shaft which rotates when said seat back is tilted, said spring drum clutch frictionally gripping said stub shaft to lock said hinge means, said spring drum clutch having first and second extensions from a helical portion;
release means operatively connected to said tilt lock means for selectively disengaging said tilt lock means in a first mode to permit repositioning said seat back, said tilt lock means being engaged to inhibit repositioning in a second mode; and
inertia lock means operatively connected to said spring drum clutch for locking said hinge means when an inertial load above a pre-determined threshold is applied to said inertia lock means, said release means being connected to first extension of said spring drum clutch said inertia lock means being connected to said second extension of said spring drum clutch whereby said release means disengages the grip of said spring drum clutch on said stub shaft and said inertia lock means increases the frictional grip of said spring drum clutch on said stub shaft, said inertia lock means having a pivotally mounted member partially rotatable about a transverse axis, said member being partially rotated when said inertial load is applied to said vehicle seat, said member having a forwardly extending lug and a rearwardly extending lug, wherein upon application of said inertial load in a forward direction said forwardly extending lug engages said tilt lock means and upon application of said inertial load in a rearward direction said rearwardly extending lug engages said tilt lock means, said member having a weight imbalance vertically above and below said transverse axis whereby application of said inertial load results in a pivoting moment about said transverse axis.

15. The recliner mechanism of claim 14 wherein said sector plate portion is interconnected through a series of reduction spur gears to said stub shaft.

16. The recliner mechanism of claim 14 wherein said inertia lock means is a torsion pendulum which engages said tilt lock means to lock said tilt lock means under all circumstances when said inertia load is applied to said torsion pendulum.

17. The recliner mechanism of claim 16 wherein said inertia lock includes a spring means connecting the torsion pendulum to said hinge for holding said torsion pendulum in its locked position after the threshold level is exceeded.

18. The recliner mechanism of claim 14 wherein said inertia lock further includes a reset means for returning said pivotally mounted member to a position in which the inertia lock is not locked.

* * * * *